US011596138B2

(12) United States Patent
Schiffer (10) Patent No.: US 11,596,138 B2
(45) Date of Patent: Mar. 7, 2023

(54) AERIAL DISPERSAL SYSTEM

(71) Applicant: Al's Aerial Spraying, LLC, Ovid, MI (US)

(72) Inventor: Albert Edward Schiffer, Ovid, MI (US)

(73) Assignee: Al's Aerial Spraying, LLC, Ovid, MI (US)

( * ) Notice: Subject to any disclaimer, the term of this patent is extended or adjusted under 35 U.S.C. 154(b) by 471 days.

(21) Appl. No.: 16/862,906

(22) Filed: Apr. 30, 2020

(65) Prior Publication Data

US 2020/0383311 A1 Dec. 10, 2020

Related U.S. Application Data

(60) Provisional application No. 62/840,800, filed on Apr. 30, 2019.

(51) Int. Cl.
| | | |
|---|---|---|
| *A01M 7/00* | (2006.01) | |
| *B64D 1/18* | (2006.01) | |
| *B05B 9/04* | (2006.01) | |
| *B64D 41/00* | (2006.01) | |
| *B64D 43/00* | (2006.01) | |
| *B05B 12/00* | (2018.01) | |
| *B05B 13/00* | (2006.01) | |

(52) U.S. Cl.
CPC ........ *A01M 7/0042* (2013.01); *A01M 7/0085* (2013.01); *A01M 7/0089* (2013.01); *B05B 9/0403* (2013.01); *B05B 12/002* (2013.01); *B05B 13/005* (2013.01); *B64D 1/18* (2013.01); *B64D 41/00* (2013.01); *B64D 43/00* (2013.01)

(58) Field of Classification Search
CPC .......... B64D 1/16; B64D 1/18; A01M 7/0089; A01M 7/0085; A01M 7/0082; B05B 9/0403; B05B 13/005
See application file for complete search history.

(56) References Cited

U.S. PATENT DOCUMENTS

| | | | | |
|---|---|---|---|---|
| 3,559,930 A | * | 2/1971 | Sellards | B64D 1/16 239/171 |
| 4,453,675 A | * | 6/1984 | Kodadek | B64D 1/18 239/171 |
| 4,589,614 A | * | 5/1986 | Stevens | B64D 1/16 169/53 |
| 4,973,361 A | * | 11/1990 | Kovaletz | B64D 1/16 134/42 |
| 5,069,400 A | * | 12/1991 | Kovaletz | B24C 3/32 244/17.11 |
| 5,653,389 A | * | 8/1997 | Henderson | B05B 12/12 239/69 |
| 5,704,546 A | * | 1/1998 | Henderson | A01M 7/0089 239/69 |
| 6,003,782 A | * | 12/1999 | Kim | B64D 1/18 239/428 |
| 6,394,365 B1 | * | 5/2002 | Jeanfreau | B05B 9/047 239/323 |

(Continued)

*Primary Examiner* — Joseph A Greenlund
(74) *Attorney, Agent, or Firm* — Quinn IP Law (57) ABSTRACT

The inventive aerial dispersal system comprises a pump assembly, a control box, an applicator assembly, a viscous pesticide tank assembly, and a means for connecting the aerial dispersal system to an airplane and is particularly useful for dispersing viscous pesticide.

14 Claims, 6 Drawing Sheets

(56) References Cited

U.S. PATENT DOCUMENTS

| | | | | |
|---|---|---|---|---|
| 7,165,627 B2* | 1/2007 | Hutter | A62C 3/0242 | 169/44 |
| 7,887,828 B2* | 2/2011 | Mafra-Neto | A01N 43/20 | 424/407 |
| 8,800,675 B2* | 8/2014 | Machado | A62C 13/78 | 169/53 |
| 8,950,696 B2* | 2/2015 | Massey | B05B 5/043 | 239/690 |
| 9,516,873 B2* | 12/2016 | Babcock | A01C 23/003 | |
| 2006/0260826 A1* | 11/2006 | Hutter | B64D 1/16 | 169/53 |
| 2006/0272562 A1* | 12/2006 | Eastin | A01M 9/00 | 239/690 |
| 2008/0254083 A1* | 10/2008 | Mafra-Neto | A01N 43/22 | 424/405 |
| 2011/0139899 A1* | 6/2011 | Robinson, Jr. | A01M 7/0089 | 239/302 |
| 2011/0252863 A1* | 10/2011 | McKay | B05B 12/126 | 73/9 |
| 2012/0171270 A1* | 7/2012 | Mafra-Neto | A01N 63/23 | 514/28 |
| 2012/0273063 A1* | 11/2012 | Honermann | A01M 7/0082 | 137/342 |
| 2013/0056230 A1* | 3/2013 | Lemke | A62C 3/0242 | 169/44 |
| 2013/0302269 A1* | 11/2013 | Gomez | A01N 25/10 | 43/107 |
| 2014/0166769 A1* | 6/2014 | Kavardinas | A01M 7/0092 | 239/70 |
| 2015/0003884 A1* | 1/2015 | Kast | A46B 11/002 | 401/6 |
| 2016/0082460 A1* | 3/2016 | McMaster | B05B 13/005 | 239/722 |
| 2017/0072236 A1* | 3/2017 | Cordani | A62C 3/0228 | |
| 2017/0297709 A1* | 10/2017 | Hawass | A62C 3/0242 | |
| 2018/0043194 A1* | 2/2018 | Zimmerman | A62C 5/022 | |
| 2018/0064091 A1* | 3/2018 | Clarke | A01M 7/0071 | |
| 2018/0110212 A1* | 4/2018 | Hashimoto | A01M 7/0042 | |
| 2018/0319500 A1* | 11/2018 | Grimm | B64D 1/18 | |
| 2018/0369851 A1* | 12/2018 | Engelbrecht | A01M 7/0089 | |
| 2019/0168874 A1* | 6/2019 | Steelman | A01C 17/001 | |
| 2019/0307058 A1* | 10/2019 | Robbins | A01C 7/085 | |
| 2019/0373880 A1* | 12/2019 | Kocer | B05B 15/658 | |
| 2020/0070194 A1* | 3/2020 | Williams | B05B 15/40 | |
| 2020/0070978 A1* | 3/2020 | Williams | B05B 9/0403 | |
| 2020/0122187 A1* | 4/2020 | DiStefano | B60R 15/02 | |
| 2020/0238322 A1* | 7/2020 | Stuke | B05B 7/32 | |
| 2020/0298261 A1* | 9/2020 | Mäenpää | E01C 19/203 | |
| 2020/0383311 A1* | 12/2020 | Schiffer | A01M 7/0042 | |
| 2021/0068335 A1* | 3/2021 | Noivirt-Brik | A01H 1/027 | |
| 2021/0139147 A1* | 5/2021 | Madison | B05B 1/083 | |
| 2021/0176976 A1* | 6/2021 | Glasbrenner | B05B 12/004 | |
| 2021/0275845 A1* | 9/2021 | Turner | A62C 37/10 | |
| 2022/0055750 A1* | 2/2022 | Steelman | B64D 43/00 | |
| 2022/0062926 A1* | 3/2022 | Yi | A01M 7/0014 | |
| 2022/0063806 A1* | 3/2022 | Tunovic | B64C 39/022 | |

* cited by examiner

AERIAL DISPERSAL SYSTEM

CROSS REFERENCE TO RELATED APPLICATIONS

This application claims priority to U.S. provisional application Ser. No. 62/840,800, entitled "Aerial Dispersal System," filed Apr. 30, 2019.

FIELD OF INVENTION

The present invention is in the field of aerial dispersal systems for dispersing viscous pesticide.

BACKGROUND

Traditionally, effective pest management required blanket-spraying of conventional pesticides. However, current dependence on conventional pesticides risks pollution of our water supply, contamination of the soil and threatens public health. Consumers and regulators now demand safer, pesticide-free produce. During the last 20 years, mating disruption has become a proactive way to protect crops by preventing pests from reproducing in the first place. By simulating the natural pheromone emission of female insects, males become confused and incapable of mating. The result is the collapse of insect pest populations without a single drop of pesticide. Traditionally, pheromone was mixed with an adhesive and then glued to a substrate such as plastic flakes. However, this had the disadvantage of inducing non-biodegradable materials into the treated area. In the last few years, pheromones have been increasingly mixed into a viscous liquid applicant such as SLAT. SPLAT is a matrix from the sustained passive release of insect pheromones. SPLAT has several advantages over pheromone mixed with an adhesive and then glued to a substrate such as plastic flakes including biodegradability. However, such viscous liquid applicants cannot be applied with the same aerial dispensing systems. Therefore, a need exists for an aerial dispersal system for dispersing viscous pesticide.

DESCRIPTION

The following description is presented to enable any person skilled in the art to make and/or use the invention. For purposes of explanation, specific nomenclature is set forth to provide a thorough understanding of the present invention. Descriptions of specific embodiments or applications are provided only as examples. Various modifications to the embodiments will be readily apparent to those skilled in the art, and general principles defined herein may be applied to other embodiments and applications without departing from the spirit and scope of the invention. Thus, the present invention is not intended to be limited to the embodiments shown, but is to be accorded the widest possible scope consistent with the principles and features disclosed herein.

The inventive aerial dispersal system for dispersing viscous pesticide comprises a pump assembly 1, a control box 2, an applicator assembly 3, a viscous pesticide tank assembly 4, and a means for connecting the aerial dispersal system to an airplane 5.

The pump assembly 1 comprises a pump housing 6, a motor 7, a pump 8 and piping 9 to convey the viscous pesticide.

In preferred embodiments, the motor 7 comprises an electric motor compatible with the aircraft's electric system and sufficient in horse power to actuate the pump 8. In preferred embodiments the motor 7 is connected to the pump 8 with a chain 10, however, other known connection means such as belt or gears would be possible. The pump 8 draws viscous pesticide from the viscous pesticide tank assembly 4 through a pipe 9 which connects the pump 8 to the viscous pesticide tank assembly 4. In preferred embodiments, a two inch diameter flexible tubing is used to reduce the pressure needed to draw the viscous pesticide through the connection pipe 9. Once the viscous pesticide passes through the pump 8 it moves into the applicator assembly connection pipe 11. The applicator assembly connection pipe 11 may include a cam lock fitting 12 to aid in cleaning the system after use. In preferred embodiments, the applicator assembly connection pipe 11 comprises a 1.5 inch flexible tubing since smaller diameter tubing is sufficient to convey the viscous pesticide at a constant pressure after it is passed through the pump 8. However, larger diameter tubing could be utilized. The pump housing 6 is designed to protect the pump assembly 1 and not alter the flight of the airplane to which the aerial dispersal system is attached. In preferred embodiments, the pump housing 6 is constructed of sheet metal and the front section of the pump housing 13 is semicircular in shape to increase aerodynamics. The front section of the pump housing 13 may be removably attached to a rectangular rear section 14 which contains the motor 7 and the pump 8 to allow for easy access to the other components of the pump assembly 1. In preferred embodiments, the front section of the pump housing 13 is removably connected to the rear section of the pump housing 14 using bolts 15. The rear section of the pump housing 14 may also include a hole 16 that can be used to manually crank the pump at startup. The rear section of the pump housing 14 may also be equipped with feet 17 to allow the aerial dispersal system to sit on the ground when not in use.

Figure 3:
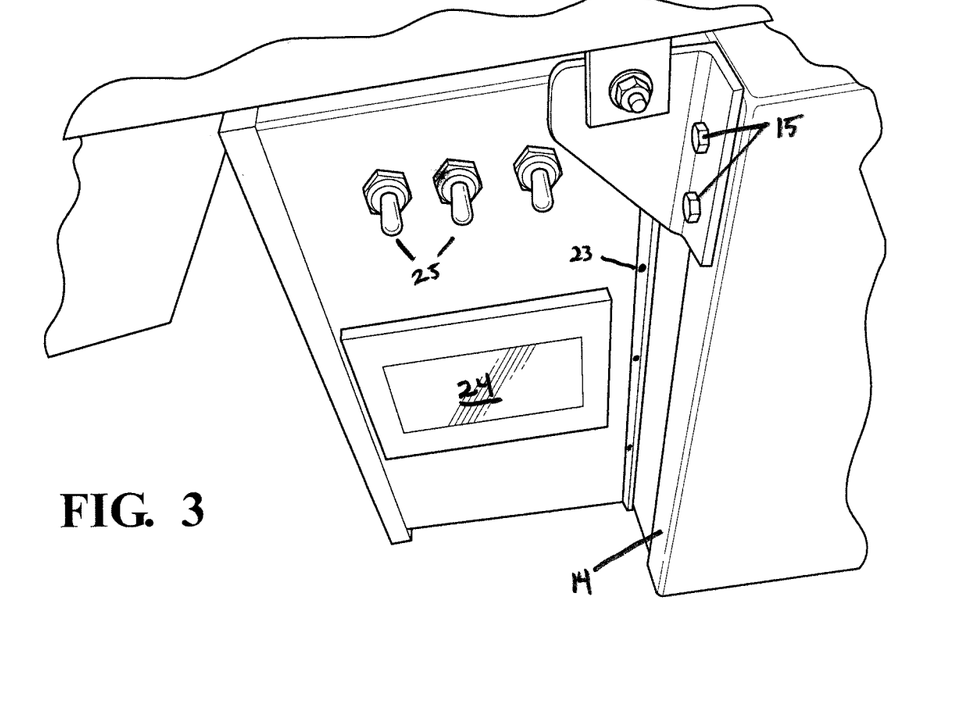
FIG. 3 is a front view of the control box.
Figure 4:
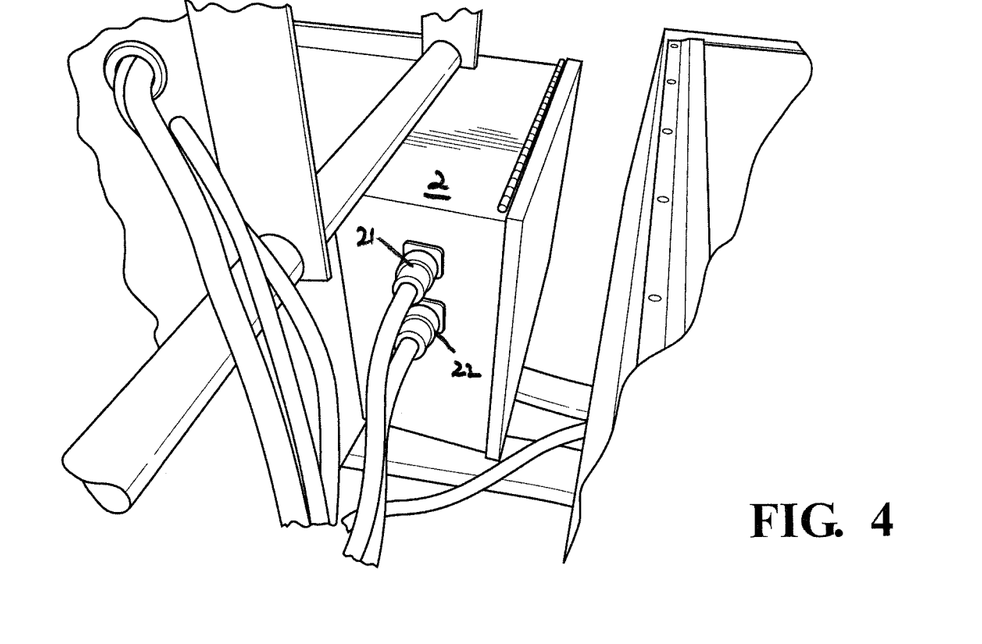
FIG. 4 is a rear view of the control box.

The control box 2 comprises electronic controls that allow the pilot of the aircraft to which the aerial dispersal system is attached to control the pump motor 7, and the three way valve motor 18 from the cockpit. The control box 2 further contains a power cord 19 that may be attached to the airplane's electrical system to power the aerial dispersal system and a control cord 20 which may be attached to switches in the cockpit of the aircraft so that the pilot may send commands to the control box 2. The control box 2 also has a pump motor cord 21 that attaches the control box 2 to the pump motor 7 and a valve motor cord 22 that attaches the control box 2 to the three-way valve motor 18 in the applicator assembly 3. In preferred embodiments, the control box 2 is attached to the rear section of the pump housing 14 with bolts 23. The control box 2 also may include an input screen 24 that allows the rpm of the pump motor 7 to be set to achieve the desired flow rate for the particular pesticide being dispersed. Optionally, the control box 2 may contain switches 25 to turn the pump motor 7 and valve motor 18 on and off without getting into the cockpit of the airplane.

The applicator assembly 3 comprises an applicator 26, a three-way valve 27, and a valve motor 18. The three-way valve 27 is connected to the applicator assembly connection pipe 11. When the aerial dispersion system is in use, viscous pesticide flows from the pump 8, through the applicator assembly connection pipe 11, to the three-way valve 27. The three-way valve 27 may then be set to direct the flow of viscous pesticide to the applicator 26. When the three-way valve 27 is set this way the viscous pesticide flows out of the applicator 26 in a continuous stream. This stream of viscous pesticide is then broken into droplets by the force of the air moving past the airplane. The three way valve 27 may also be set to circulate the viscous pesticide back into the pesticide tank assembly 4 through a tank refill pipe 28. When the valve 27 is set this way, the viscous pesticide bypasses the applicator 26 and flows back into the tank 4. This creates a constant flow of viscous pesticide to the system that insures a constant pressure is exerted on the viscous pesticide. The three-way value motor 18 is used to change the settings of the valve 27. A refill valve 29 may also be added to the tank refill pipe 28 that allows for viscous pesticide to be added to the tank assembly 4. In preferred embodiments, the refill valve 29 is a dry break valve to insure that air is not introduced to the viscous pesticide during refilling.

Figure 1:
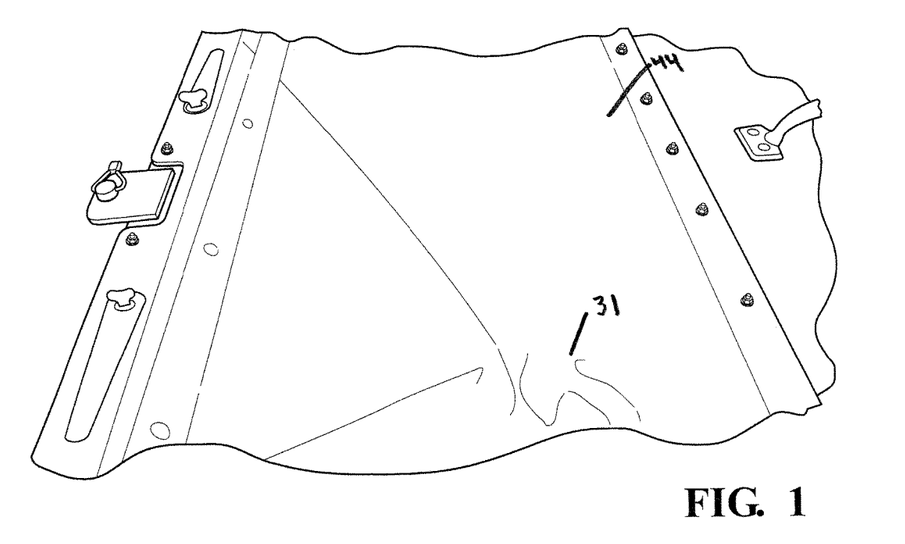
FIG. 1 is a perspective view of the top of tank assembly.
Figure 2:
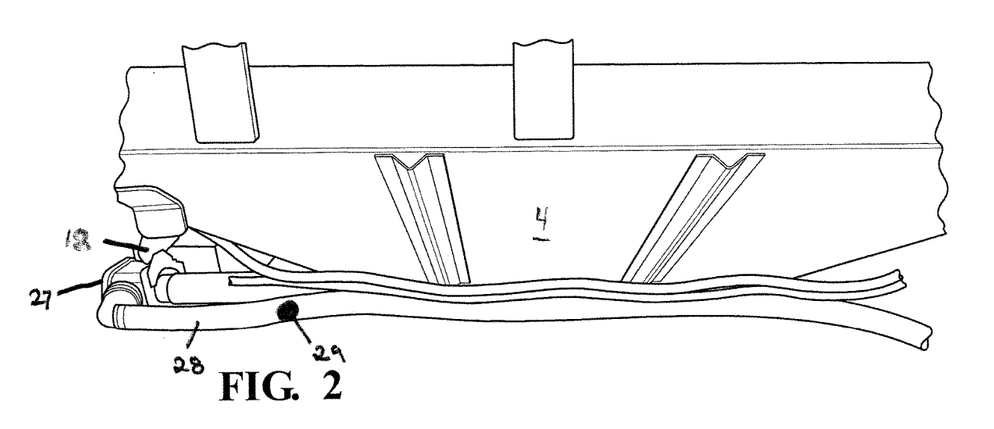
FIG. 2 is a side view of the tank assembly.
Figure 7:
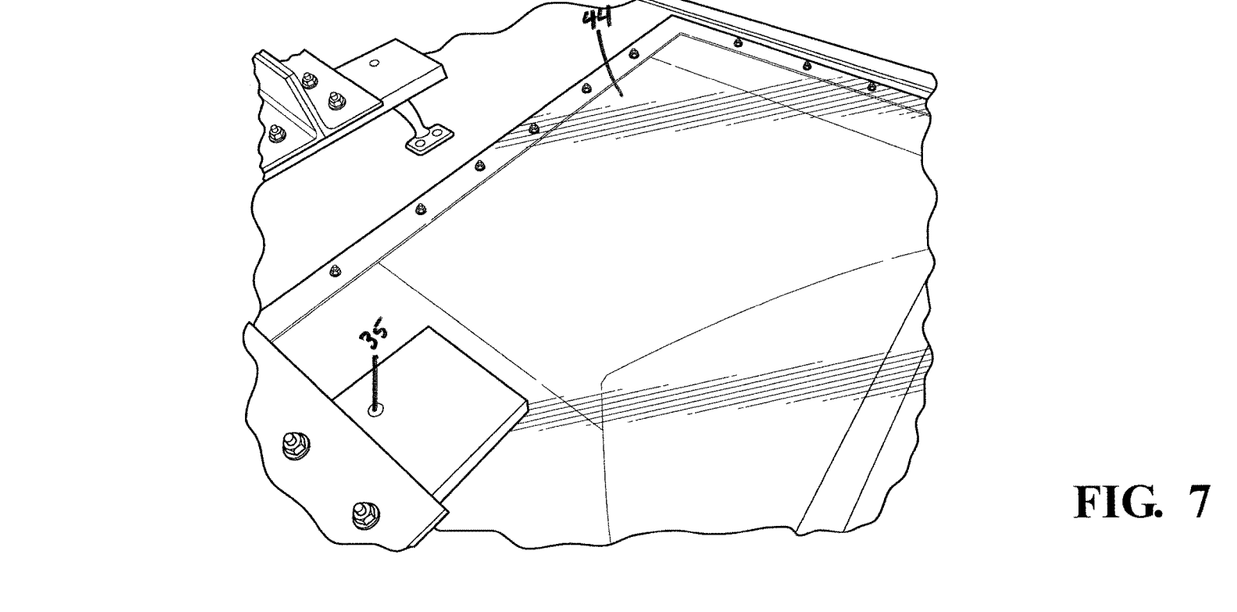
FIG. 7 is a perspective view of the top of the tank assembly.
Figure 8:
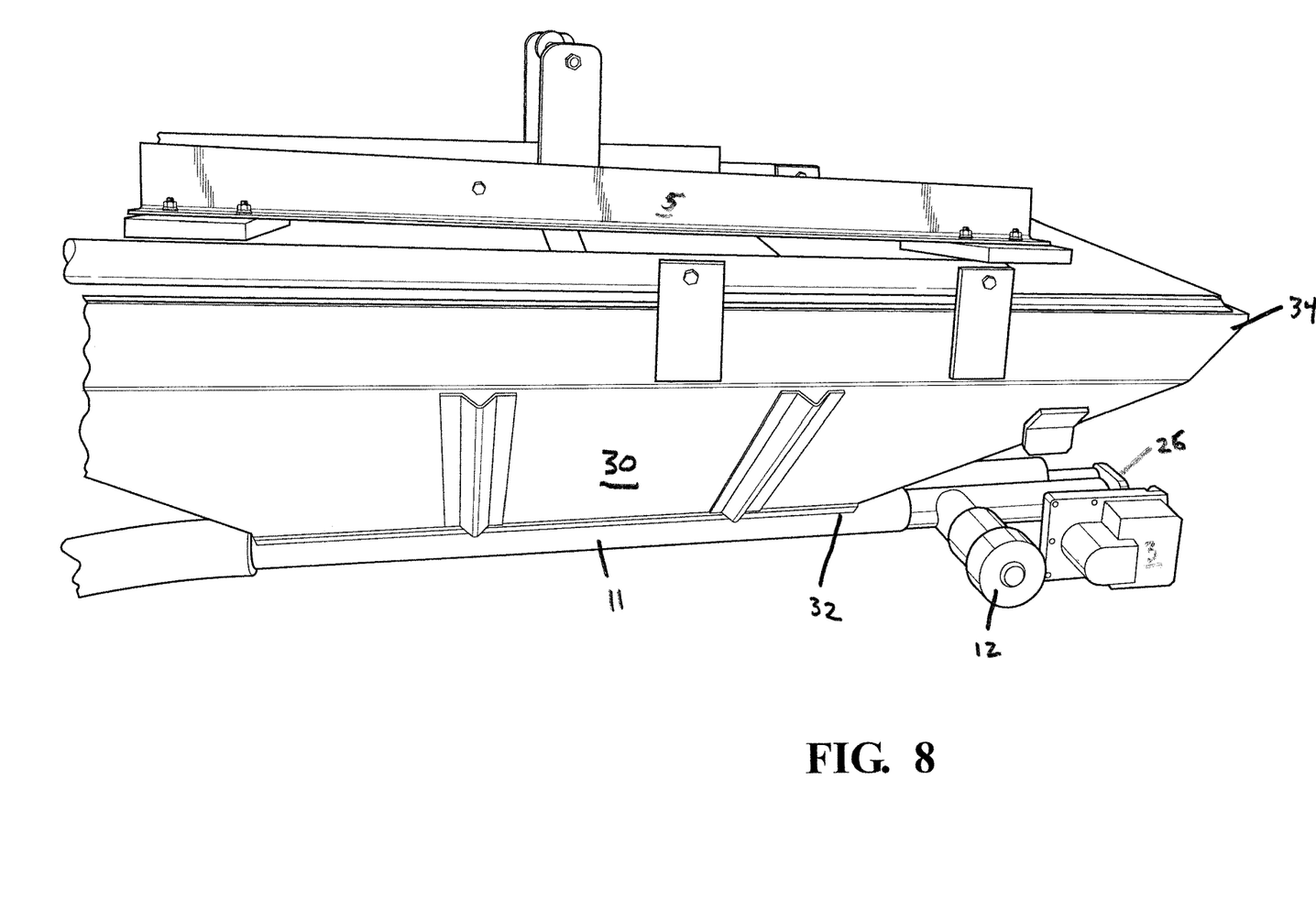
FIG. 8 is a side view of the rear of the aerial dispersal systems for dispersing viscous pesticide.
Figure 9:
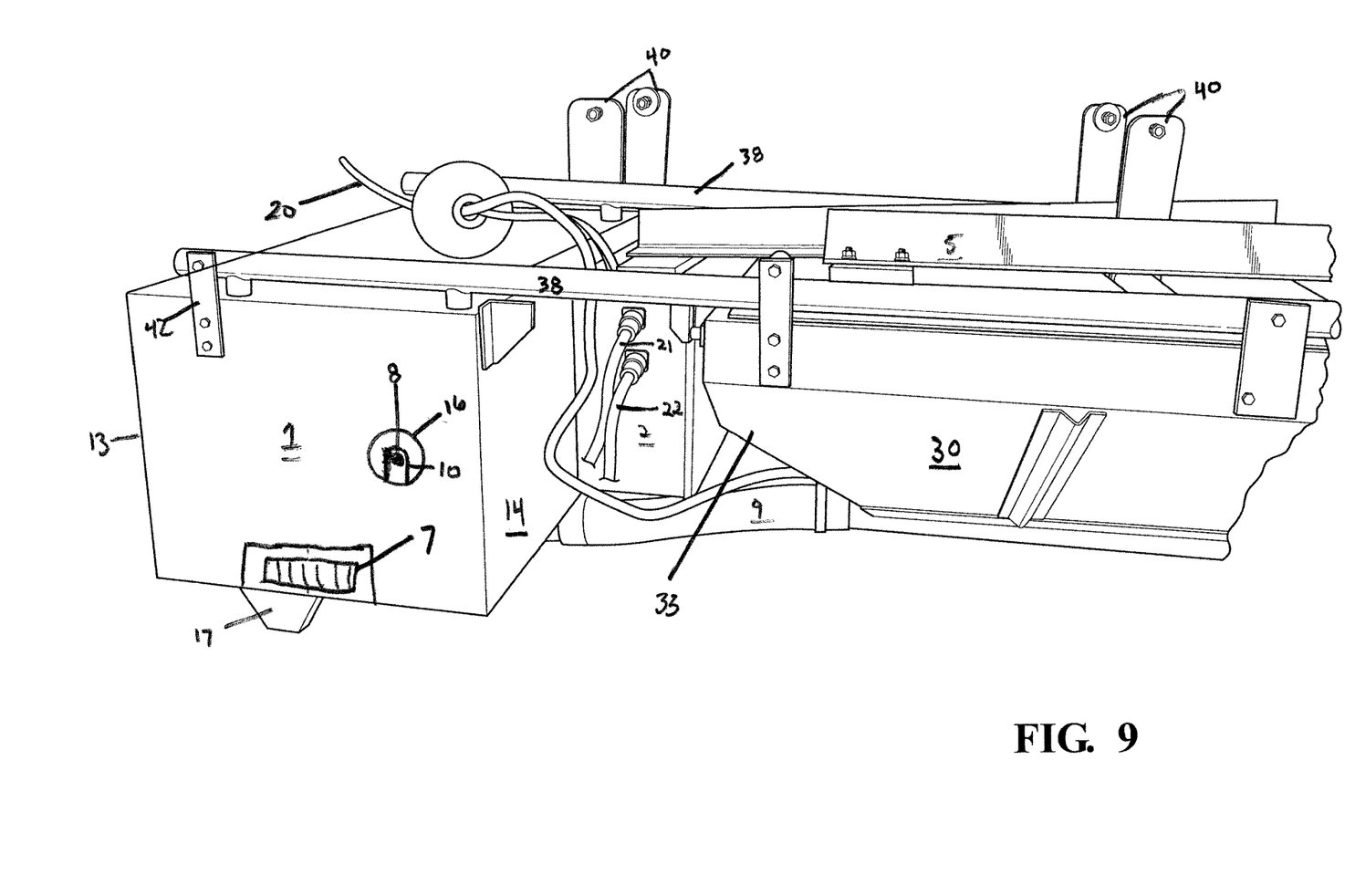
FIG. 9 is a side view of the front of the aerial dispersal systems for dispersing viscous pesticide.

The viscous pesticide tank assembly 4 comprises a tank 30 and a bladder 31. In preferred embodiments, the tank 30 is a triangular trough and positioned so that the point of the triangle 32 is directed towards the ground. The front of the tank 33 is connected to the pump 8 with 2 inch pipe 9. The rear of the tank 34 is attached to the applicator assembly 3 through the tank refill pipe 28. The top of the tank 44 comprises a bladder 31 that depresses into the tank 30 as viscous pesticide is removed. The bladder 31 insures that air is not mixed with the viscous pesticide and that the tank 30 is consistently emptied to the greatest extent possible as the viscous pesticide is applied. The bladder 31 may also include at least one air release valve 35 to remove any air that gets inside of the tank assembly 4. In the preferred embodiment, two air release valves 35 are utilized.

Figure 5:
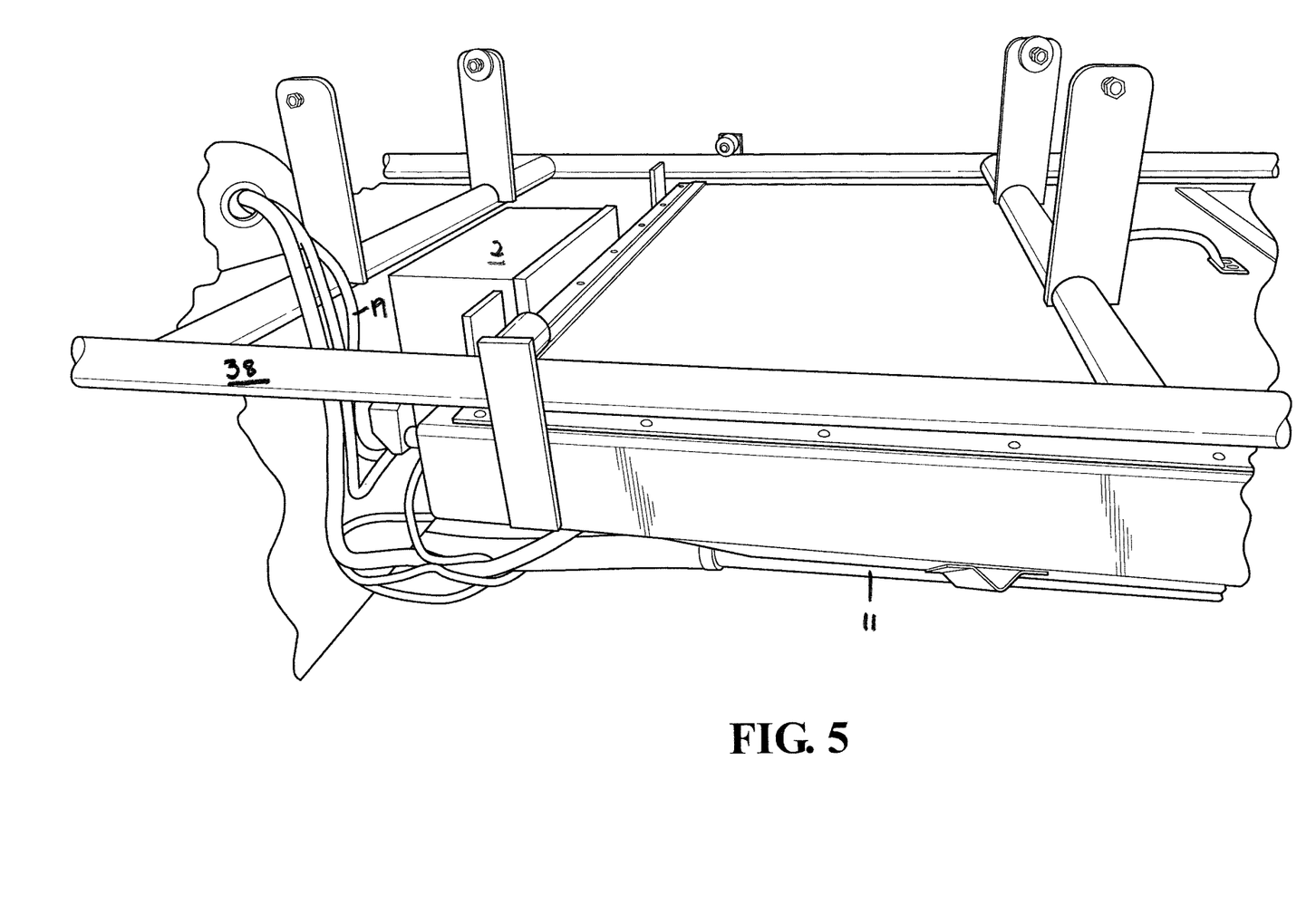
FIG. 5 is a side perspective view of the aerial dispersal systems for dispersing viscous pesticide showing the airplane attachment system.
Figure 6:
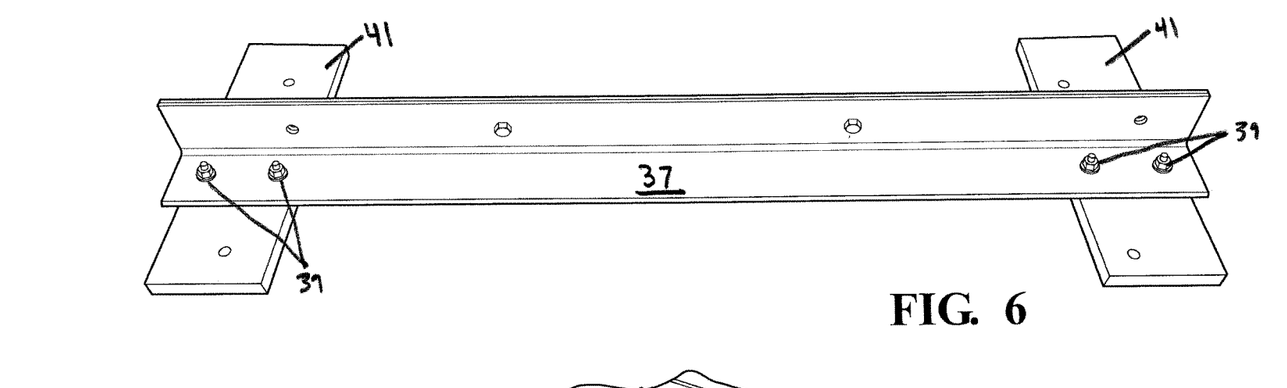
FIG. 6 is a perspective view of the H frame.

In the preferred embodiment, the means for connecting the aerial dispersal system to an airplane 5 comprises an airplane attachment system 36. This airplane attachment system 36 further comprises an H-frame 37 and a plurality of rails 38. In the preferred embodiment, two rails 38 are attached to the airplane using bolts 39. Each rail 38 is then bolted to two vertical structures 40 on the H-frame 37. The vertical structures 40 are welded to the two horizontal steel structures 41 which are in turn welded to steel bars 42 that run from the viscous pesticide tank 30 to the pump housing 6. The H-frame 37 is attached to both the viscous pesticide tank 30 and the pump housing 6 using bolts 43.

The invention claimed is:

1. An aerial dispersal system for dispersing viscous pesticide comprising:
    a pump assembly, wherein the pump assembly includes:
        a pump housing;
        a motor;
        a pump; and
        piping to convey the viscous pesticide;
    a control box;
    an applicator assembly, wherein the applicator assembly includes:
        an applicator;
        a three-way valve; and
        a valve motor;
    a tank assembly, wherein the tank assembly includes:
        a tank; and
        a bladder; and
    a means for connecting the aerial dispersal system to an airplane,
    wherein the three-way valve is configured to direct the flow of the viscous pesticide to the applicator or to recirculate the viscous pesticide to the bladder,
    wherein a constant pressure is exerted on the viscous pesticide whether being directed to the applicator or recirculated to the bladder,
    wherein the control box is attached to a rear section of the pump housing with bolts, and
    wherein the control box further comprises switches to turn the pump motor and the three-way valve motor on and off without getting into a cockpit of the airplane.

2. The aerial dispersal system of claim 1, wherein the tank is a triangular trough and positioned so that the point of the triangle is directed towards the ground.

3. The aerial dispersal system of claim 1, wherein the bladder further comprises at least one air release valve to remove any air that gets inside of the tank assembly.

4. The aerial dispersal system of claim 1, wherein the means for connecting the aerial dispersal system to the airplane comprises:
    an H-frame; and
    a plurality of rails.

5. The aerial dispersal system of claim 4, wherein two rails of the plurality of rails are attached to the airplane using bolts.

6. The aerial dispersal system of claim 5, wherein each of the two rails is then bolted to two vertical structures on the H-frame.

7. The aerial dispersal system of claim 6, wherein the vertical structures are welded to two horizontal steel structures which are in turn welded to steel bars that run from a tank of the tank assembly to the pump housing.

8. The aerial dispersal system of claim 7, wherein the H-frame is attached to both the tank and the pump housing using bolts.

9. The aerial dispersal system of claim 1, wherein the cockpit includes electronic controls that allow a pilot of the aircraft to which the aerial dispersal system is attached to control a pump motor, and a three-way valve motor from the cockpit.

10. The aerial dispersal system of claim 9, wherein the control box further comprises:
    a power cord attached to the airplane's electrical system to power the aerial dispersal system; and
    a control cord attached to switches in the cockpit of the aircraft that conveys electrical signals to the control box.

11. The aerial dispersal system of claim 10, wherein the control box further comprises:
    a pump motor cord that attaches the control box to the pump motor; and
    a valve motor cord that attaches the control box to the three-way valve motor in the applicator assembly.

12. The aerial dispersal system of claim 10, wherein the control box further comprises an input screen that allows the rpm of the pump motor to be set to achieve a desired flow rate for the viscous pesticide being dispersed.

13. The aerial dispersal system of claim 1, wherein the tank assembly further comprises a refill valve.

14. The aerial dispersal system of claim 13, wherein the refill valve is a dry break valve to ensure that air is not introduced to the viscous pesticide during refilling.

* * * * *

UNITED STATES PATENT AND TRADEMARK OFFICE
CERTIFICATE OF CORRECTION

| | |
|---|---|
| PATENT NO. | : 11,596,138 B2 |
| APPLICATION NO. | : 16/862906 |
| DATED | : March 7, 2023 |
| INVENTOR(S) | : Albert Edward Schiffer and Michael D. Schiffer |

It is certified that error appears in the above-identified patent and that said Letters Patent is hereby corrected as shown below:

On the Title Page

Item (12), delete "Schiffer" and insert -- Schiffer et al. --

Item (72), should read:
Albert Edward Schiffer
Ovid, MI, United States
Michael D. Schiffer
Ovid, MI, United States Signed and Sealed this
Twenty-eighth Day of November, 2023

Katherine Kelly Vidal
*Director of the United States Patent and Trademark Office*